(No Model.)
G. W. AGIN.
ICE VELOCIPEDE.
No. 475,744. Patented May 31, 1892.
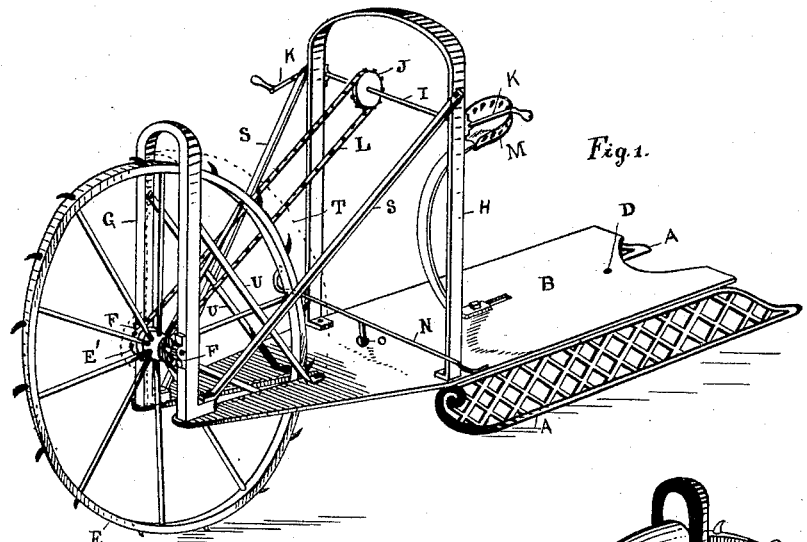
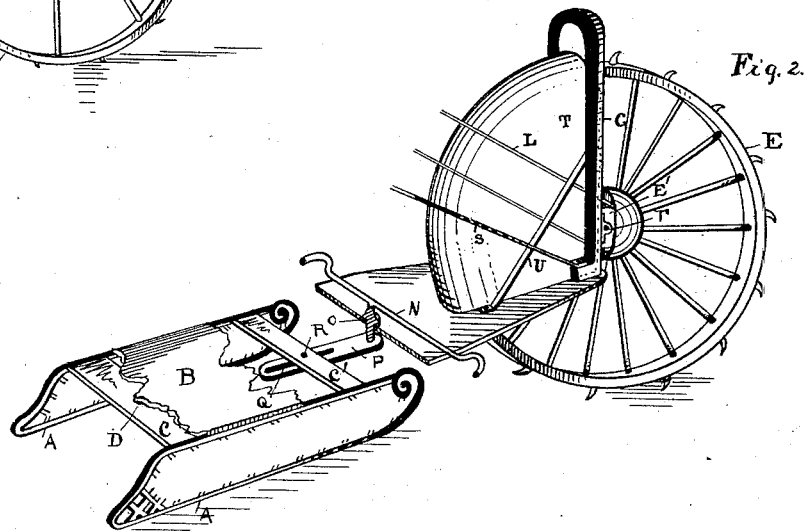
Witnesses
A. Keithley
F. J. O'Brien
Inventor
George W. Agin
By L. M. Thurlow,
Atty

UNITED STATES PATENT OFFICE.

GEORGE W. AGIN, OF PEKIN, ILLINOIS.

ICE-VELOCIPEDE.

SPECIFICATION forming part of Letters Patent No. 475,744, dated May 31, 1892.

Application filed November 23, 1891. Serial No. 412,746. (No model.)

*To all whom it may concern:*

Be it known that I, GEORGE W. AGIN, a citizen of the United States, residing at Pekin, in the county of Tazewell and State of Illinois, have invented certain new and useful Improvements in Velocipedes; and I do hereby declare the following to be a full, clear, and exact description of the invention, such as will enable others skilled in the art to which it appertains to make and use the same.

This invention relates to improvements in velocipedes.

The object of the invention is to provide a velocipede for winter use either on snow or ice.

In the drawings presented herewith, Figure 1 represents a perspective view of the invention. Fig. 2 also represents a perspective view of the invention, showing certain parts broken away to show operating portions.

A A represents the runners of a sled, on which is mounted a supporting-board B. The sled is provided with two cross-pieces C and C', and the said board B is pivoted at its rear end to the rear cross-piece C at D.

The wheel to which the power is applied is shown at E, and is provided with spikes or teeth upon its periphery. The axle of said wheel E is journaled in bearings F, and the bearings are bolted to a yoke G. The lower free ends of the yoke G support the forward end of the board B.

Secured to the board B a short distance behind the wheel E is a yoke H, which stands in a perpendicular position and which supports a shaft and sprocket-wheel I and J, respectively. Both ends of the shaft I are provided with a crank K. The axle of wheel E is designed to turn in the bearings F, and a sprocket-wheel E' is secured to said shaft or to the hub of wheel, and is given motion by means of a sprocket-chain L, passing over the wheel J on shaft I. A seat M is adjustably secured to the board B, as shown.

The steering device may be understood from the following: A rod N is held horizontally above the sled upon a perpendicular rod O, which passes through the board B and secured to a slotted plate or arm P. The slot Q in this plate engages with a depending pin R, held in the cross-piece C' of sled. A shoulder is formed on the bar C, and this rests on the board B to hold the arm N in its position. Two braces S S are attached to one end to the upper part of the yoke H and at the other end to the lower end of the yoke G, thus lending strength and rigidity to the device and, also, braces U U are used to rigidly support the said yoke G.

A shield T (shown in Fig. 2, but in Fig. 1 in dotted lines) is placed over the upper rear portion of the wheel E, as shown, to keep the rider free from dirt.

The operation of the device is as follows: The rider, sitting in the seat, places his feet on the steering-bar N and turns the cranks K with his hands. This turning of the cranks imparts motion to the wheel E, and said wheel being, as before stated, provided with picks or teeth, takes hold on the snow or ice and thus motion is obtained. When it is desired to turn the velocipede to the right, the left foot is pushed forward, and this swings the bar N in a direction to swing the sled to the left, and this movement brings the wheel to the right, or vice versa.

Having thus described my invention, what I claim as new, and desire to secure by Letters Patent, is—

In a velocipede for winter use, a sled composed of the runners A A, with the rear and forward cross-pieces C and C', respectively, in combination with a supporting-board B, pivoted at its rear end to the rear cross-piece C, a steering-rod N, secured at right angles to a perpendicular rod O, a slotted plate P, attached at right angles to the rod O and engaging with a pin R in the forward cross-piece C', and a toothed wheel E, having bearings in a yoke G, secured to the forward end of said supporting-board, and a sprocket-wheel E', mounted on the hub or axle of said wheel E, and a sprocket-chain L, in connection with a sprocket-wheel J on the shaft I, mounted on a yoke H, bolted to the supporting-board, for the purposes herein described and shown.

In testimony whereof I affix my signature in presence of two witnesses.

GEORGE W. AGIN.

Witnesses:
F. H. STANBERY,
M. H. GOLLEN.